United States Patent
Lynch et al.

(10) Patent No.: US 10,965,342 B2
(45) Date of Patent: *Mar. 30, 2021

(54) ROTORCRAFT TAIL BOOM HEALTH MANAGEMENT SYSTEM

(71) Applicant: Simmonds Precision Products, Inc., Vergennes, VT (US)

(72) Inventors: Michael A. Lynch, Shelburne, VT (US); David F. Larsen, Orwell, VT (US)

(73) Assignee: Simmonds Precision Products, Inc., Vergennes, VT (US)

(*) Notice: Subject to any disclaimer, the term of this patent is extended or adjusted under 35 U.S.C. 154(b) by 0 days.

This patent is subject to a terminal disclaimer.

(21) Appl. No.: 16/043,954

(22) Filed: Jul. 24, 2018

(65) Prior Publication Data

US 2018/0331722 A1    Nov. 15, 2018

Related U.S. Application Data

(63) Continuation of application No. 15/490,687, filed on Apr. 18, 2017, now Pat. No. 10,044,410.

(51) Int. Cl.
*H04B 3/54* (2006.01)
*G07C 5/08* (2006.01)
(Continued)

(52) U.S. Cl.
CPC ............. *H04B 3/54* (2013.01); *B64C 27/04* (2013.01); *B64D 41/00* (2013.01); *G07C 5/0808* (2013.01); *B64D 2221/00* (2013.01); *Y02T 50/40* (2013.01)

(58) Field of Classification Search
CPC .......... H04B 3/54; H04B 3/542; H04B 3/544; H04B 3/546; H04B 3/548; G07C 5/0808; B64D 41/00; B64D 2221/00
See application file for complete search history.

(56) References Cited

U.S. PATENT DOCUMENTS 5,531,402 A * 7/1996 Dahl ................... B64C 13/503
                                                        244/189
6,127,939 A    10/2000 Lesesky et al.
(Continued)

FOREIGN PATENT DOCUMENTS

| FR | 2928020 A1 | 8/2009 |
|---|---|---|
| WO | WO2015126686 A1 | 8/2015 |
| WO | WO2015191144 A2 | 12/2015 |

OTHER PUBLICATIONS

Extended European Search Report for EP Application No. 18167659.4, dated Aug. 30, 2018, 8 Pages.

*Primary Examiner* — Siu M Lee
(74) *Attorney, Agent, or Firm* — Kinney & Lange, P.A.

(57) ABSTRACT

A system for data transfer in a rotorcraft includes a power bus extending from a power source in a main fuselage of the rotorcraft to provide electrical power to electrical loads located in a tail boom section of the rotorcraft, a first power line communication node on the power bus in the tail boom section of the rotorcraft, a second power line communication node on the power bus in the main fuselage of the rotorcraft, and a digital sensor bus connected to the first power line communication node. Information from the digital sensor bus is transmitted to the first power line communication node and across the power bus to the second power line communication node.

20 Claims, 3 Drawing Sheets

(51) Int. Cl.
*B64D 41/00* (2006.01)
*B64C 27/04* (2006.01)

(56) References Cited

U.S. PATENT DOCUMENTS

| | | | |
|---|---|---|---|
| 7,893,557 B2 | | 2/2011 | Davis et al. |
| 8,730,113 B2 | * | 5/2014 | Stoneback ............ H01P 1/2005 |
| | | | 343/705 |
| 8,944,367 B2 | | 2/2015 | Bystry, Jr. et al. |
| 9,108,739 B2 | * | 8/2015 | Purpura ................ B64D 45/00 |
| 9,350,423 B2 | | 5/2016 | Mitchell et al. |
| 10,044,410 B1 | * | 8/2018 | Lynch ...................... H04B 3/54 |
| 2009/0201973 A1 | * | 8/2009 | Cranford, Jr. .......... H04B 1/707 |
| | | | 375/130 |
| 2010/0034655 A1 | * | 2/2010 | Jolly .................... B64C 27/001 |
| | | | 416/145 |
| 2010/0214183 A1 | | 8/2010 | Stoneback et al. |
| 2012/0068015 A1 | * | 3/2012 | Dock .................... B64D 25/00 |
| | | | 244/121 |
| 2013/0157559 A1 | | 6/2013 | Flammer, III et al. |
| 2014/0091953 A1 | * | 4/2014 | Scott ..................... H04N 19/17 |
| | | | 341/87 |
| 2014/0330454 A1 | | 11/2014 | Purpura |
| 2015/0180538 A1 | | 6/2015 | Smith et al. |
| 2016/0244176 A1 | * | 8/2016 | Xiao ........................ B60L 7/10 |
| 2017/0053463 A1 | | 2/2017 | Pereira |
| 2017/0129600 A1 | * | 5/2017 | Rancourt ............. B64C 39/022 |
| 2018/0170532 A1 | * | 6/2018 | Black .................... B64C 27/001 |
| 2018/0208463 A1 | * | 7/2018 | Halsey ................. C01B 3/0005 |

* cited by examiner

ROTORCRAFT TAIL BOOM HEALTH MANAGEMENT SYSTEM

CROSS-REFERENCE TO RELATED APPLICATION(S)

This application is a continuation of U.S. application Ser. No. 15/490,687 filed Apr. 18, 2017 entitled "ROTORCRAFT TAIL BOOM HEALTH MANAGEMENT SYSTEM" by Michael A. Lynch and David F. Larsen.

BACKGROUND

The present disclosure relates generally to data transfer systems, and in particular, to data transfer systems in aircraft.

A health and usage management system (HUMS) in an aircraft uses a data transfer system to gather information about extremities of the aircraft, such as a tail boom section of a rotorcraft. The main HUMS is located in the main fuselage of the aircraft where the power source is also located. Often, the HUMS data transfer system requires large amounts of wiring, wire hangers, and connectors to collect and send data from the extremity of the aircraft to the health and usage management system located in the main fuselage. A simpler and more efficient data transfer system is needed.

SUMMARY

A system for data transfer in a rotorcraft includes a power bus extending from a power source in a main fuselage of the rotorcraft to provide electrical power to electrical loads located in a tail boom section of the rotorcraft, a first power line communication node on the power bus in the tail boom section of the rotorcraft, a second power line communication node on the power bus in the main fuselage of the rotorcraft, and a digital sensor bus connected to the first power line communication node. Information from the digital sensor bus is transmitted to the first power line communication node and across the power bus to the second power line communication node.

A system for data transfer in an aircraft includes a power bus extending from a power source in a main fuselage of the aircraft to provide electrical power to electrical loads located in an extremity of the aircraft, a first power line communication node on the power bus in the extremity of the aircraft; a second power line communication node on the power bus in the main fuselage of the aircraft; and a digital sensor bus connected to the first power line communication node. The extremity of the aircraft is physically isolated by distance from the main fuselage of the aircraft. Information from the digital sensor bus is transmitted to the first power line communication node and across the power bus to the second power line communication node.

DETAILED DESCRIPTION

In general, the present disclosure describes a data transfer system for a health and usage management system (HUMS) on a rotorcraft that uses power line communication nodes on existing power lines to bi-directionally and securely send data between the tail boom section and the main fuselage. The system reduces system weight, complexity, and installation effort by reducing the volume of wiring, wire hangers, and connectors, which also reduces manufacturing, operating, and maintenance costs. Without additional wires, the system can process larger volumes and different types of data, including data processing in the tail boom section itself, producing more efficient, functional, and advanced data transfer and analysis of the health status of the tail boom section. Further, power can be stored in the tail boom section when the power line is active so that health monitoring is possible when the aircraft is unpowered and inactive.

Figure 1:
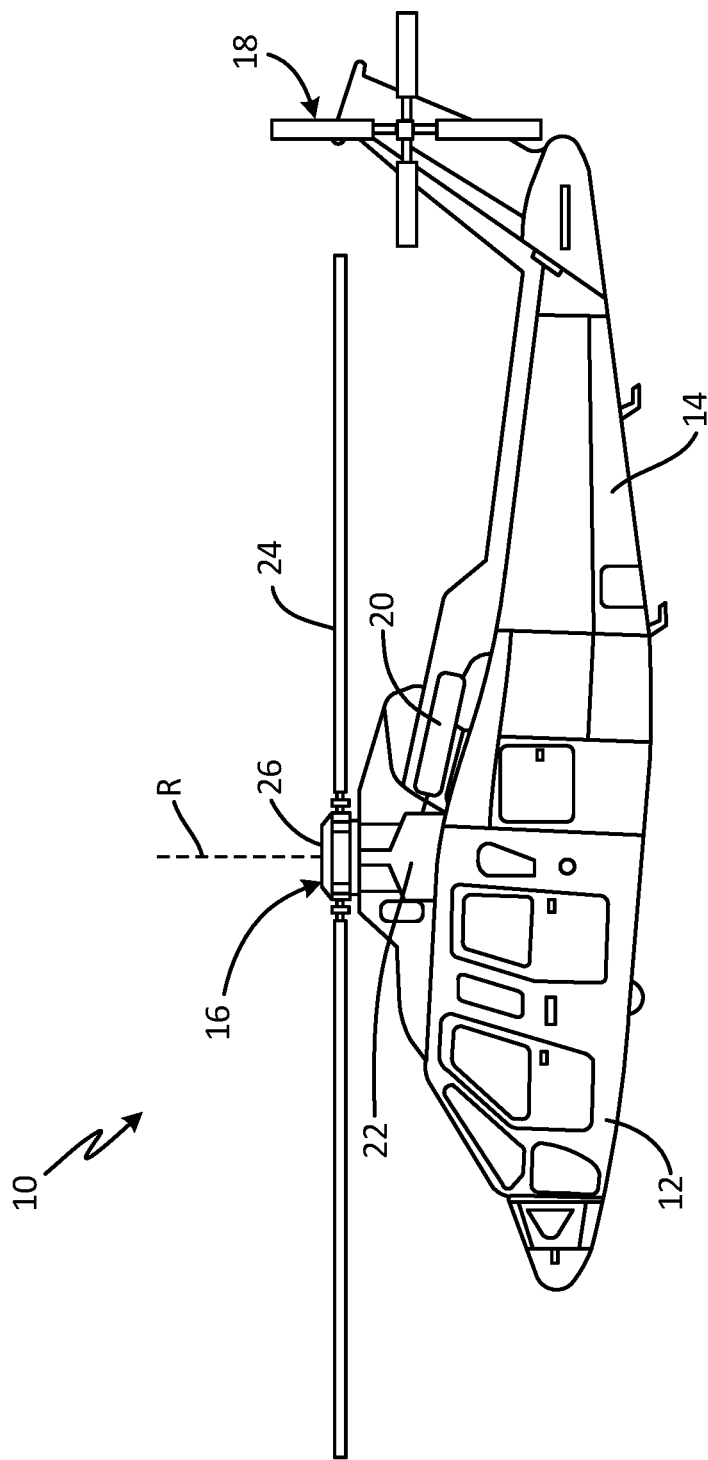
FIG. 1 is a perspective view of a rotorcraft.

FIG. 1 is a perspective view of rotorcraft 10. Rotorcraft 10 includes main fuselage 12, tail boom section 14, main rotor assembly 16, tail rotor system 18, engine 20, and main gearbox 22. Main rotor assembly 16 includes rotor blades 24 and rotor hub 26. Also shown in FIG. 1 is axis of rotation R.

Rotorcraft 10 has main fuselage 12 with tail boom section 14 connected to and extending from main fuselage 12. Tail boom section 14 is an isolated extremity of main fuselage 12. Main rotor assembly 16 is mounted to a top of main fuselage 12 and tail rotor system 18 is mounted to tail boom section 14 near an aft end of tail boom section 14. Engine 20 (shown schematically) is disposed within main fuselage 12. Engine 20 is connected to main gearbox 22 (shown schematically). Main gearbox 22 is connected to main rotor assembly 16. Main rotor assembly 16 includes first ends of rotor blades 24 connected to rotor hub 26. Rotor blades 24 are connected around a circumference of rotor hub 26.

Engine 20 and main gearbox 22 drive main rotor assembly 16 around an axis of rotation R. Power source 30 (shown in FIGS. 2A and 2B) of rotorcraft 10 is located within main fuselage 12 to power components within main fuselage 12. A majority of processing required for systems of rotorcraft 10 also takes place in main fuselage 12. Power is required in tail boom section 14 for motor actuation, lighting, heaters, anti-icing, and other components requiring power. Because tail boom section 14 is physically remote from main fuselage 12, power acquisition and sensors in tail boom section 14 require electrical connection to main fuselage 12 via wiring or other electrical connections.

Figure 2A:
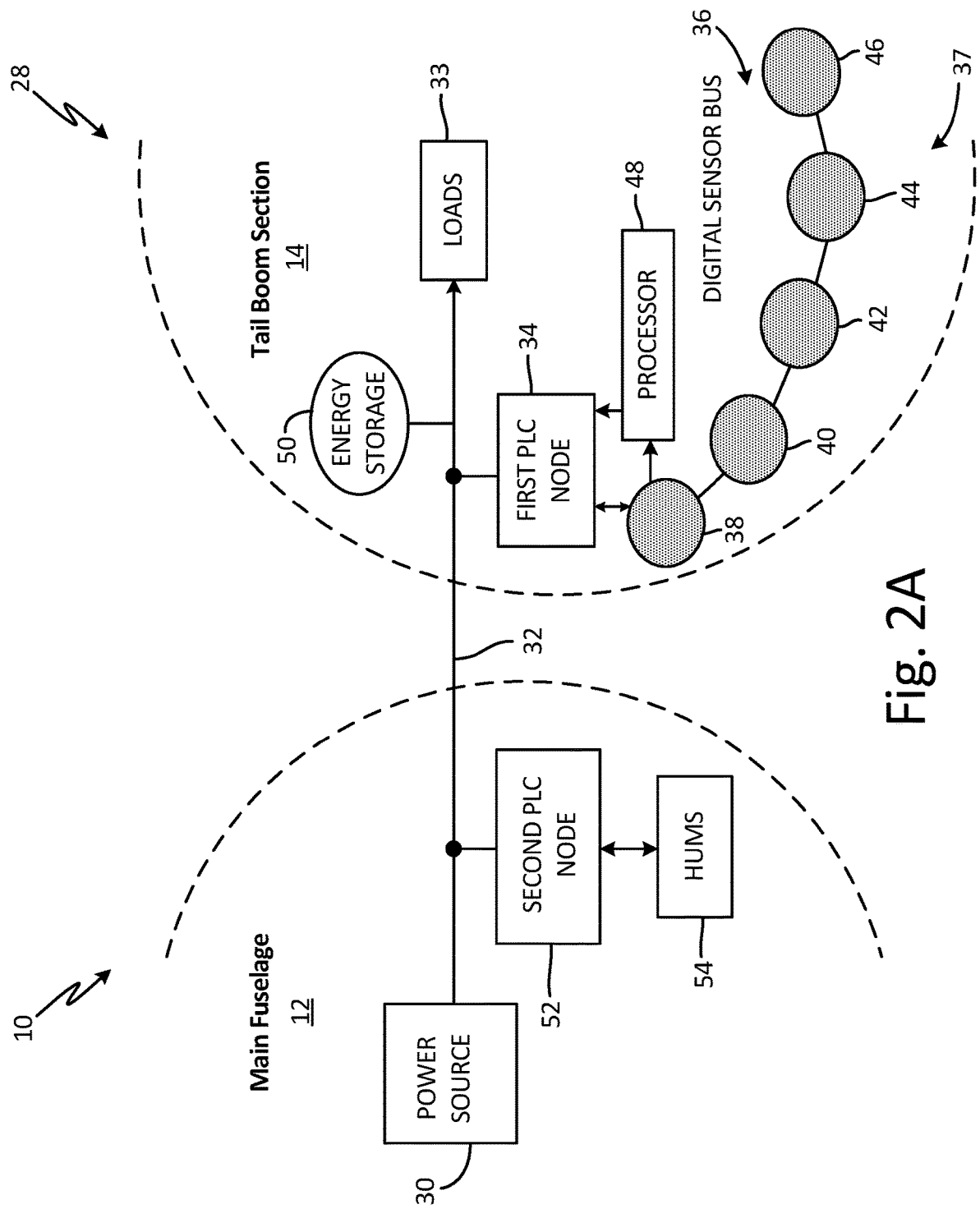
FIG. 2A is a block diagram of a HUMS data transfer system of the rotorcraft.

FIG. 2A is a block diagram of HUMS data transfer system 28 of rotorcraft 10. Rotorcraft 10 includes main fuselage 12, tail boom section 14, power source 30, power bus 32, and loads 33. HUMS data transfer system 28 includes: a first power line communication (PLC) node 34; digital sensor bus 36, which collects data 37 including accelerometer data 38, index sensor data 40, strain gauge monitoring data 42, current monitoring data 44, and structural health monitoring data 46; processor 48; energy storage module 50; second power line communication node 52; and HUMS 54.

Rotorcraft 10 has main fuselage 12 with tail boom section 14 connected to and extending from main fuselage 12. Tail boom section 14 is an isolated extremity of main fuselage 12. Power source 30 is located in main fuselage 12. Power bus 32 extends from power source 30 in main fuselage 12 to tail boom section 14. Power bus 32 extends to loads 33 in tail boom section 14. Loads 33 may include actuators, lights, heaters, anti-icing components, or other components requiring power. Power bus 32 includes wiring or power line structure used to provide power from main fuselage 12 to tail boom section 14.

First power line communication node 34 is positioned on power bus 32 in tail boom section 14. First power line communication node 34 may be a plurality of power line communication nodes in tail boom section 14. Digital sensor bus 36 is connected to first power line communication node 34 in tail boom section 14. Digital sensor bus 36 includes a plurality of sensors that collect one or more of the following types of data 37: accelerometer data 38, index sensor data 40, strain gauge monitoring data 42, current monitoring data 44, and structural health monitoring data 46. Digital sensor bus 36 may be a smart sensing system. Digital sensor bus 36 can be a serial communications bus (e.g. RS485, RS482, or other serial communications bus), Ethernet, or any other suitable communications bus. Processor 48 is also connected to each of first power line communication node 34 and digital sensor bus 36. Processor 48 may process data 37 similarly to a HUMS. Energy storage module 50 is located in tail boom section 14. Energy storage module 50 is connected to power bus 32. In alternate embodiments, energy storage module 50 is connected to first power line communication node 34 (shown in FIG. 2B). A second power line communication node 52 is positioned on power bus 32 in main fuselage 12. Second power line communication node 52 is connected to first power line communication node 34 through power bus 32. Second power line communication node 52 may be a plurality of power line communication nodes in main fuselage 12. HUMS 54 is connected to second power line communication node 52 through a digital interface. HUMS 54 is the main health and usage management system of rotorcraft 10.

Power source 30 delivers electrical power to components of rotorcraft 10. Power bus 32 delivers power from power source 30 to tail boom section 14. Power bus 32 can carry AC power, DC power, or both AC power and DC power. Power delivered to tail boom section 14 can be used to power loads 33, such as actuators, lights, heaters, anti-icing components, and other components. Energy storage module 50 is connected to power bus 32 to store power from power bus 32 in tail boom section 14. Energy storage module 50 stores power whenever power is present on power bus 32. In aircraft implementations where power bus 32 includes two or more individual power lines delivering power to tail boom section 14 for multiple power loads 33 (e.g. motor actuation, lighting, heaters, anti-icing, or other components requiring power), energy storage module 50 may store power from any power present. Energy storage module 50 supplies power to first power line communication node 34, digital sensor bus 36, and processor 48 when power is removed from power bus 32.

Digital sensor bus 36 collects data 37, such as accelerometer data 38, index sensor data 40, strain gauge monitoring data 42, current monitoring data 44, and structural health monitoring data 46, and transmits data 37 to first power line communication node 34. Data 37 is used to monitor bearings, gear boxes, tail rotor system 18, and other components in tail boom section 14. Alternatively, digital sensor bus 36 transmits data 37 to processor 48 and processor 48 analyzes, compresses, and processes data 37 from digital sensor bus 36 before data 37 is transmitted to first power line communication node 34. Processor 48 can process data 37, such as structural health monitoring data 46, in tail boom section 14, such that data 37 is consolidated and analyzed in tail boom section 14 before it is forwarded to main fuselage 12 for further processing at HUMS 54. First power line communication node 34 modulates data 37 onto power bus 32 and transmits data 37 across power bus 32 to second power line communication node 52. Data 37 is transmitted using spread spectrum type transmission. As such, power and communications are combined on power bus 32. Data 37 may be transmitted across power bus 32 with or without power being present on power bus 32. Second power line communication node 52 transmits data 37 received from first power line communication node 34 to HUMS 54. Second power line communication node 52 can also modulate data 37 onto power bus 32 and transmit data 37 across power bus 32 to first power line communication node 34. As such, communication between first power line communication node 34 and second power line communication node 52 is bi-directional. HUMS 54 further processes and analyzes data 37 to derive information about the health condition of rotorcraft 10.

Energy storage module 50 stores power so that when power is removed from power loads 33 or the aircraft is inactive and unpowered the stored power can be used to supply power to first power line communication node 34, digital sensor bus 36, and processor 48. As such, health monitoring is possible even when main fuselage 12 of rotorcraft 10 is not providing power. As rotorcraft often sit unpowered for long periods of time, the ability to continue health monitoring when main fuselage 12 is not providing power is valuable. For example, structural health monitoring for impact damage and strain and environmental sensing can be carried out on an unpowered rotorcraft 10. Further, tail boom section 14 can recognize when rotorcraft 10 is operational by sensing that power is present.

Transmission of data 37 through first power line communication node 34, power bus 32, and second power line communication node 52 allows for data transfer from an isolated extremity of the rotorcraft, tail boom section 14, to main fuselage 12 using existing power bus 32. Because HUMS data transfer system 28 uses existing power bus 32 and monitoring of tail boom section 14 is largely isolated from the rest of condition monitoring, HUMS data transfer system 28 can be used in tail boom section 14 of rotorcraft 10 without having to upgrade any other systems on rotorcraft 10. Individual wire runs, including separate wire runs for each sensor collecting data 37, are not required to send data 37 from tail boom section 14 to main fuselage 12. As such, the volume of required wiring, wire hangers, and connectors is reduced, which reduces system weight, complexity, and installation effort. The reduction in wiring also reduces manufacturing, operating, and maintenance costs. Because the limitations of wire volume and weight are no longer present, a larger volume of data 37 can be collected and processed, and more types of data 37 can be collected and processed, adding capability and sophistication to tail boom section 14. More specifically, the reduction in weight resulting from the reduction in wiring may allow for the addition of sensors, including different types of sensors, which may not have been possible with the original weight budget. Further, processing some of data 37 in tail boom section 14 allows for reduced data transfer volume and more efficient transmission of data 37 to main fuselage 12 in addition to the opportunity to act on data 37 locally in tail boom section 14. More specifically, data fusion at processor 48 enables unnecessary or invalid raw data to be removed before data 37 is sent forward to main fuselage 12. Qualifying data 37 at processor 48, which includes making sure all of the necessary data sets are present before sending data forward to main fuselage 12, also makes data transfer more efficient. As a result, HUMS data transfer system 28 empowers HUMS 54 to collect more and different types of data, adding to the effectiveness and variety of data collection, fusion, processing, and feature extraction, resulting in more advanced and intelligent analysis of the health status of tail boom section 14 of rotorcraft 10. Further, more health monitoring features can be added over time without having to add additional wiring.

Because data 37 is transmitted using spread spectrum type transmission, data 37 is transmitted at low signal energy, which makes data transmission hard to observe. More specifically, the transmission would look like noise routinely produced by power bus 32 and would therefore blend in with such noise. As a result, the transmission is secure. No electromagnetic signatures, which would otherwise be evident in a wireless transmission implementation, would emanate from rotorcraft 10.

Figure 2B:
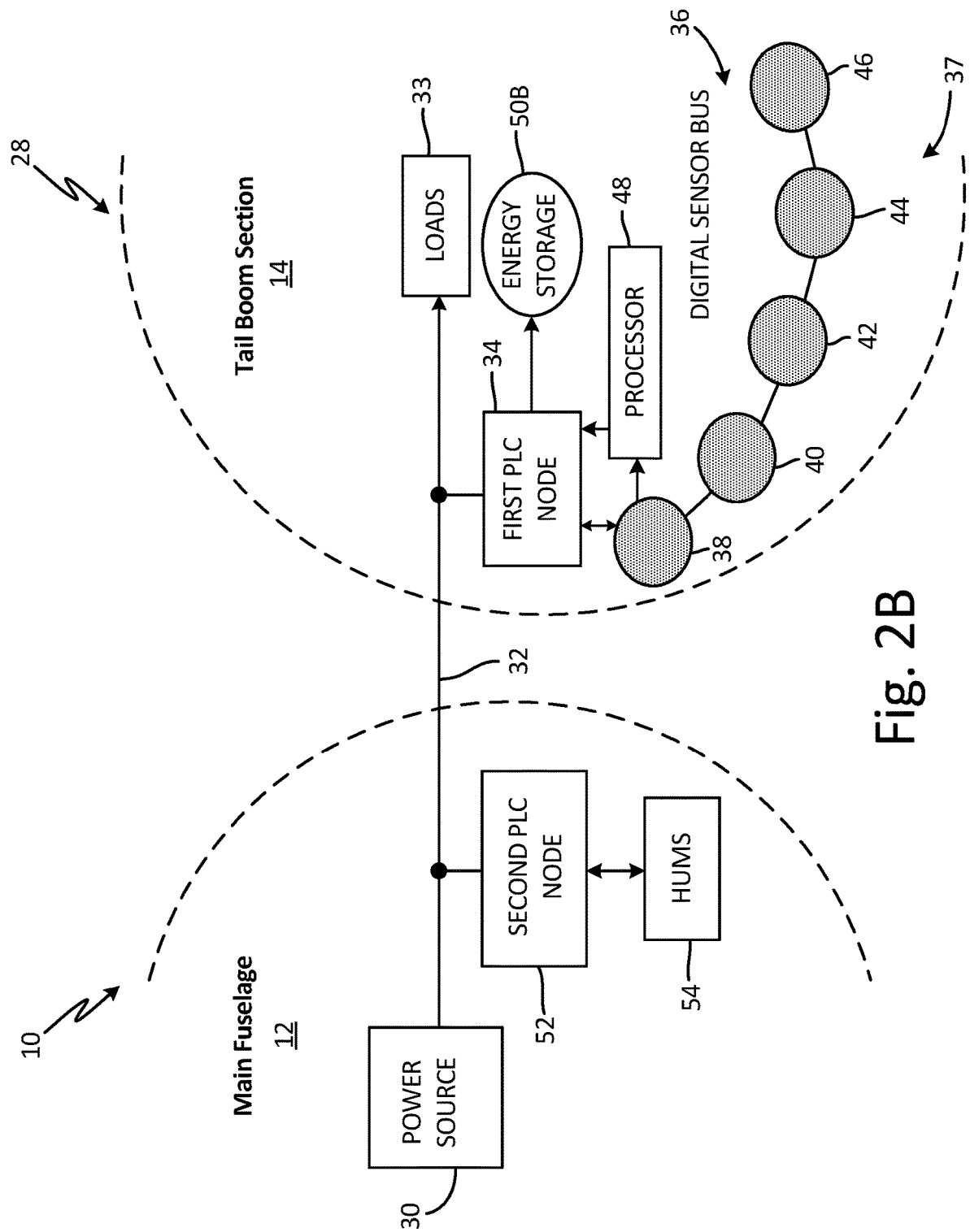
FIG. 2B is a block diagram of a second embodiment of a HUMS data transfer system of the rotorcraft.

FIG. 2B is a block diagram of a second embodiment of HUMS data transfer system 28 of rotorcraft 10. In the example of FIG. 2B, energy storage module 50B is connected to first power line communication node 34 rather than directly to power bus 32. As illustrated, rotorcraft 10 includes main fuselage 12, tail boom section 14, power source 30, power bus 32, and loads 33. HUMS data transfer system 28 includes: a first power line communication node 34; digital sensor bus 36, which collects data 37 including accelerometer data 38, index sensor data 40, strain gauge monitoring data 42, current monitoring data 44, and structural health monitoring data 46; processor 48; energy storage module 50B; second power line communication node 52; and HUMS 54.

Rotorcraft 10 has main fuselage 12 with tail boom section 14 connected to and extending from main fuselage 12. Tail boom section 14 is an isolated extremity of main fuselage 12. Power source 30 is located in main fuselage 12. Power bus 32 extends from power source 30 in main fuselage 12 to tail boom section 14. Power bus 32 extends to loads 33 in tail boom section 14. Loads 33 may include actuators, lights, heaters, anti-icing components, or other components requiring power. Power bus 32 includes wiring or power line structure used to provide power from main fuselage 12 to tail boom section 14.

First power line communication node 34 is positioned on power bus 32 in tail boom section 14. First power line communication node 34 may be a plurality of power line communication nodes in tail boom section 14. Digital sensor bus 36 is connected to first power line communication node 34 in tail boom section 14. Digital sensor bus 36 includes a plurality of sensors that collect one or more of the following types of data 37: accelerometer data 38, index sensor data 40, strain gauge monitoring data 42, current monitoring data 44, and structural health monitoring data 46. Digital sensor bus 36 may be a smart sensing system. Digital sensor bus 36 can be a serial communications bus (e.g. RS485, RS482, or other serial communications bus), Ethernet, or any other suitable communications bus. Processor 48 is also connected to each of first power line communication node 34 and digital sensor bus 36. Processor 48 may process data 37 similarly to a HUMS. Energy storage module 50B is located in tail boom section 14. Energy storage module 50B is connected to first power line communication node 34. In alternate embodiments, energy storage module 50B is connected to power bus 32 (shown in FIG. 2A). A second power line communication node 52 is positioned on power bus 32 in main fuselage 12. Second power line communication node 52 is connected to first power line communication node 34 through power bus 32. Second power line communication node 52 may be a plurality of power line communication nodes in main fuselage 12. HUMS 54 is connected to second power line communication node 52 through a digital interface. HUMS 54 is the main health and usage management system of rotorcraft 10.

Power source 30 delivers electrical power to components of rotorcraft 10. Power bus 32 delivers power from power source 30 to tail boom section 14. Power bus 32 can carry AC power, DC power, or both AC power and DC power. Power delivered to tail boom section 14 can be used to power loads 33, such as actuators, lights, heaters, anti-icing components, and other components. Energy storage module 50B is connected to first power line communication node 34 to store power from power bus 32 in tail boom section 14. Energy storage module 50B stores power whenever power is present on power bus 32. Energy storage module 50B supplies power to first power line communication node 34, digital sensor bus 36, and processor 48 when power is removed from power bus 32.

Digital sensor bus 36 collects data 37, such as accelerometer data 38, index sensor data 40, strain gauge monitoring data 42, current monitoring data 44, and structural health monitoring data 46, and transmits data 37 to first power line communication node 34. Data 37 is used to monitor bearings, gear boxes, tail rotor system 18, and other components in tail boom section 14. Alternatively, digital sensor bus 36 transmits data 37 to processor 48 and processor 48 analyzes, compresses, and processes data 37 from digital sensor bus 36 before data 37 is transmitted to first power line communication node 34. Processor 48 can process data 37, such as structural health monitoring data 46, in tail boom section 14, such that data 37 is consolidated and analyzed in tail boom section 14 before it is forwarded to main fuselage 12 for further processing at HUMS 54. First power line communication node 34 modulates data 37 onto power bus 32 and transmits data 37 across power bus 32 to second power line communication node 52. Data 37 is transmitted using spread spectrum type transmission. As such, power and communications are combined on power bus 32. Data 37 may be transmitted across power bus 32 with or without power being present on power bus 32. Second power line communication node 52 transmits data 37 received from first power line communication node 34 to HUMS 54. Second power line communication node 52 can also modulate data 37 onto power bus 32 and transmit data 37 across power bus 32 to first power line communication node 34. As such, communication between first power line communication node 34 and second power line communication node 52 is bi-directional. HUMS 54 further processes and analyzes data 37 to derive information about the health condition of rotorcraft 10.

Energy storage module 50B stores power so that when power is removed from power loads 33 or the aircraft is inactive and unpowered the stored power can be used to supply power to first power line communication node 34, digital sensor bus 36, and processor 48. As such, health monitoring is possible even when main fuselage 12 of rotorcraft 10 is not providing power. As rotorcraft often sit unpowered for long periods of time, the ability to continue health monitoring when main fuselage 12 is not providing power is valuable. For example, structural health monitoring for impact damage and strain and environmental sensing can be carried out on an unpowered rotorcraft 10. Further, tail boom section 14 can recognize when rotorcraft 10 is operational by sensing that power is present.

Transmission of data 37 through first power line communication node 34, power bus 32, and second power line communication node 52 allows for data transfer from an isolated extremity of the rotorcraft, tail boom section 14, to main fuselage 12 using existing power bus 32. Because HUMS data transfer system 28 uses existing power bus 32 and monitoring of tail boom section 14 is largely isolated from the rest of condition monitoring, HUMS data transfer system 28 can be used in tail boom section 14 of rotorcraft 10 without having to upgrade any other systems on rotorcraft 10. Individual wire runs, including separate wire runs for each sensor collecting data 37, are not required to send data 37 from tail boom section 14 to main fuselage 12. As such, the volume of required wiring, wire hangers, and connectors is reduced which reduces system weight, complexity, and installation effort. The reduction in wiring also reduces manufacturing, operating, and maintenance costs. Because the limitations of wire volume and weight are no longer present, a larger volume of data 37 can be collected and processed and more types of data 37 can be collected and processed, adding capability and sophistication to tail boom section 14. More specifically, the reduction in weight resulting from the reduction in wiring may allow for the addition of sensors, including different types of sensors, which may not have been possible with the original weight budget. Further, processing some of data 37 in tail boom section 14 allows for reduced data transfer volume and more efficient transmission of data 37 to main fuselage 12 in addition to the opportunity to act on data 37 locally in tail boom section 14. More specifically, data fusion at processor 48 enables unnecessary or invalid raw data to be removed before data 37 is sent forward to main fuselage 12. Qualifying data 37 at processor 48, which includes making sure all of the necessary data sets are present before sending data forward to main fuselage 12, also makes data transfer more efficient. As a result, HUMS data transfer system 28 empowers HUMS 54 to collect more and different types of data, adding to the effectiveness and variety of data collection, fusion, processing, and feature extraction, resulting in more advanced and intelligent analysis of the health status of tail boom section 14 of rotorcraft 10. Further, more health monitoring features can be added over time without having to add additional wiring.

Because data 37 is transmitted using spread spectrum type transmission, data 37 is transmitted at low signal energy, which makes data transmission hard to observe. More specifically, the transmission would look like noise routinely produced by power bus 32 and would therefore blend in with such noise. As a result, the transmission is secure. No electromagnetic signatures, which would otherwise be evident in a wireless transmission implementation, would emanate from rotorcraft 10.

HUMS data transfer system 28 may be used on aircraft other than rotorcraft 10 to transmit data from extremities or areas without their own power or processing capabilities other than tail boom section 14, such as a landing gear of a fixed wing aircraft.

Discussion of Possible Embodiments

The following are non-exclusive descriptions of possible embodiments of the present disclosure.

A system for data transfer in a rotorcraft includes a power bus extending from a power source in a main fuselage of the rotorcraft to a tail boom section of the rotorcraft; a first power line communication node on the power bus in the tail boom of the rotorcraft; a second power line communication node on the power bus in the main fuselage of the rotorcraft; and a digital sensor bus connected to the first power line communication node; wherein information from the digital sensor bus is transmitted to the first power line communication node and across the power bus to the second power line communication node.

The system of the preceding paragraph can optionally include, additionally and/or alternatively, any one or more of the following features, configurations and/or additional components:

A health and usage management system connected to the second power line communication node, wherein information is transmitted from the second power line communication node to the health and usage management system.

A processor connected to the digital sensor bus and the first power line communication node in the tail boom section, wherein the information from the digital sensor bus is analyzed, compressed, and processed at the processor before it is sent to the main fuselage.

The processor is a health and usage management system.

The digital sensor bus comprises information selected from the group consisting of: accelerometer data, index sensor data, strain gauge monitoring data, current monitoring data, and structural health monitoring data.

An energy storage module connected to the power bus in the tail boom section, wherein the energy storage module is configured to store power.

The energy storage module is configured to provide power when the main fuselage of the rotorcraft is not providing power.

The information is transmitted using spread spectrum type transmission.

The power bus is powered using AC power or DC power.

The information is transmitted with or without power present.

A system for data transfer in an aircraft includes a power bus extending from a power source in a main fuselage of the aircraft to an extremity of the aircraft, wherein the extremity of the aircraft is isolated from the main fuselage of the aircraft; a first power line communication node on the power bus in the extremity of the aircraft; a second power line communication node on the power bus in the main fuselage of the aircraft; and a digital sensor bus connected to the first power line communication node; wherein information from the digital sensor bus is transmitted to the first power line communication node and across the power bus to the second power line communication node.

The system of the preceding paragraph can optionally include, additionally and/or alternatively, any one or more of the following features, configurations and/or additional components:

A health and usage management system connected to the second power line communication node, wherein information is transmitted from the second power line communication node to the health and usage management system.

A processor connected to the digital sensor bus and the first power line communication node in the extremity of the aircraft, wherein the information from the digital sensor bus is analyzed, compressed, and processed at the processor before it is sent to the main fuselage.

The processor is a health and usage management system.

The digital sensor bus comprises information selected from the group consisting of: accelerometer data, index sensor data, strain gauge monitoring data, current monitoring data, and structural health monitoring data.

An energy storage module connected to the power bus in the extremity of the aircraft, wherein the energy storage module is configured to store power.

The energy storage module is configured to provide power when the main fuselage of the aircraft is not providing power.

The information is transmitted using spread spectrum type transmission.

The power bus is powered using AC power or DC power.

The information is transmitted with or without power present.

The extremity of the aircraft is a landing gear of a fixed wing aircraft.

The system does not use wireless communication to transmit information from the tail boom section to the main fuselage.

While the invention has been described with reference to an exemplary embodiment(s), it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment(s) disclosed, but that the invention will include all embodiments falling within the scope of the appended claims.

The invention claimed is:

1. A system for data transfer in an aircraft comprising:
    a power bus extending internally within the aircraft from a power source in a main fuselage of the aircraft to provide electrical power to electrical loads located in an extremity of the aircraft, wherein the extremity of the aircraft connects to and extends from the main fuselage of the aircraft and wherein the extremity of the aircraft is physically isolated by distance from the main fuselage of the aircraft;
    a first power line communication node on the power bus in the extremity of the aircraft;
    a second power line communication node on the power bus in the main fuselage of the aircraft;
    an energy storage module in the extremity of the aircraft connected to the power bus in the extremity of the aircraft, wherein the energy storage module is configured to store power from the power bus in the extremity of the aircraft and supply power to the first power line communication node when power is removed from the power bus;
    a digital sensor bus in the extremity of the aircraft connected to the first power line communication node in the extremity of the aircraft; and
    a processor connected to the digital sensor bus and the first power line communication node in the extremity of the aircraft;
    wherein information from the digital sensor bus is transmitted to the first power line communication node and across the power bus to the second power line communication node; and
    wherein the information from the digital sensor bus comprises information selected from the group consisting of: accelerometer data, strain gauge monitoring data, current monitoring data, and structural health monitoring data.

2. The system of claim 1, wherein the aircraft is a rotorcraft and the extremity of the aircraft is a tail boom section of the rotorcraft.

3. The system of claim 1, wherein the information is transmitted using spread spectrum type transmission.

4. A system for data transfer in an aircraft comprising:
    a power bus extending from a power source in a main fuselage of the aircraft to provide electrical power to electrical loads located in an extremity of the aircraft, wherein the extremity of the aircraft is physically isolated by distance from the main fuselage of the aircraft;
    a first power line communication node on the power bus in the extremity of the aircraft;
    a second power line communication node on the power bus in the main fuselage of the aircraft;
    a digital sensor bus connected to the first power line communication node; and
    a processor connected to the digital sensor bus and the first power line communication node in the extremity of the aircraft, wherein the information from the digital sensor bus is analyzed, compressed, and processed at the processor before it is sent to the main fuselage, and wherein the processor can process data similarly to a health and usage management system;
    wherein information from the digital sensor bus is transmitted to the first power line communication node and across the power bus to the second power line communication node; and
    wherein the information from the digital sensor bus comprises information selected from the group consisting of: accelerometer data, index sensor data, strain gauge monitoring data, current monitoring data, and structural health monitoring data.

5. A system for data transfer in an aircraft comprising:
    a power bus extending internally within the aircraft from a power source in a main fuselage of the aircraft to provide electrical power to electrical loads located in an extremity of the aircraft, wherein the extremity of the aircraft connects to and extends from the main fuselage of the aircraft and wherein the extremity of the aircraft is physically isolated by distance from the main fuselage of the aircraft;
    a first power line communication node on the power bus in the extremity of the aircraft;
    a second power line communication node on the power bus in the main fuselage of the aircraft;
    an energy storage module in the extremity of the aircraft connected to the power bus in the extremity of the aircraft, wherein the energy storage module is configured to store power from the power bus in the extremity of the aircraft and supply power to the first power line communication node when power is removed from the power bus;
    a digital sensor bus connected to the first power line communication node; and
    a processor connected to the digital sensor bus and the first power line communication node in the extremity of the aircraft;
    wherein information from the digital sensor bus is transmitted to the first power line communication node and across the power bus to the second power line communication node.

6. The system of claim 5, wherein the aircraft is a rotorcraft and the extremity of the aircraft is a tail boom section of the rotorcraft.

7. The system of claim 5, wherein information from the digital sensor bus comprises information selected from the group consisting of: accelerometer data, index sensor data, strain gauge monitoring data, current monitoring data, and structural health monitoring data.

8. The system of claim 5, wherein the information from the digital sensor bus is analyzed, compressed, and processed at the processor before it is sent to the main fuselage.

9. The system of claim 5, wherein the processor can process data similarly to a health and usage management system.

10. The system of claim 5, wherein the energy storage module is configured to provide power when the main fuselage of the aircraft is not providing power.

11. The system of claim 5, wherein the information is transmitted using spread spectrum type transmission.

12. The system of claim 5, wherein the power bus is powered using AC power or DC power.

13. A system for data transfer in an aircraft comprising:
a power bus extending internally within the aircraft from a power source in a main fuselage of the aircraft to provide electrical power to electrical loads located in an extremity of the aircraft, wherein the extremity of the aircraft connects to and extends from the main fuselage of the aircraft and wherein the extremity of the aircraft is physically isolated by distance from the main fuselage of the aircraft;
a first power line communication node on the power bus in the extremity of the aircraft;
a second power line communication node on the power bus in the main fuselage of the aircraft;
an energy storage module connected to the first power line communication node in the extremity of the aircraft, wherein the energy storage module is configured to store power from the power bus in the extremity of the aircraft and supply power to the first power line communication node when power is removed from the power bus;
a digital sensor bus connected to the first power line communication node; and
a processor connected to the digital sensor bus and the first power line communication node in the extremity of the aircraft;
wherein information from the digital sensor bus is transmitted to the first power line communication node and across the power bus to the second power line communication node.

14. The system of claim 13, wherein the aircraft is a rotorcraft and the extremity of the aircraft is a tail boom section of the rotorcraft.

15. The system of claim 13, wherein the information from the digital sensor bus comprises information selected from the group consisting of: accelerometer data, index sensor data, strain gauge monitoring data, current monitoring data, and structural health monitoring data.

16. The system of claim 13, wherein the information from the digital sensor bus is analyzed, compressed, and processed at the processor before it is sent to the main fuselage.

17. The system of claim 13, wherein the processor can process data similarly to a health and usage management system.

18. The system of claim 13, wherein the energy storage module is configured to provide power when the main fuselage of the aircraft is not providing power.

19. The system of claim 13, wherein the information is transmitted using spread spectrum type transmission.

20. The system of claim 13, wherein the power bus is powered using AC power or DC power.

\* \* \* \* \*